US006057541A

United States Patent [19]

Steenblik

[11] Patent Number: 6,057,541

[45] Date of Patent: May 2, 2000

[54] METHOD AND APPARATUS FOR SELECTIVELY CONTROLLING THE QUANTUM STATE PROBABILITY DISTRIBUTION OF CORRELATED QUANTUM OBJECTS

[75] Inventor: Richard A. Steenblik, Dunwoody, Ga.

[73] Assignee: Ansible, Inc., Alpharetta, Ga.

[21] Appl. No.: 08/819,975

[22] Filed: Mar. 18, 1997

[51] Int. Cl.[7] .............................. H01J 40/14; G02F 1/01; H04B 10/00

[52] U.S. Cl. ............................................ 250/225; 250/216

[58] Field of Search .................................... 250/225, 216, 250/214 R, 227.11, 227.21

[56] References Cited

U.S. PATENT DOCUMENTS

| | | | |
|---|---|---|---|
| 5,113,524 | 5/1992 | Hirota et al. | 359/115 |
| 5,243,649 | 9/1993 | Franson | 380/9 |
| 5,339,182 | 8/1994 | Kimble et al. | 359/112 |

OTHER PUBLICATIONS

Haji–Hassan et al., "Polarization Correlation Analysis of the Radiation from a Two–Photon Deuterium Source Using Three Polarizers: A test of Quantum Mechanics Versus Local Realism," *Physical Review Letters*, vol. 62, No. 3, Jan. 16, 1989, pp. 237–240.

Alain Aspect et al., Experimental Tests of Realistic Local Theories via Bell's Theorem, Aug. 17, 1981, Phys. Lett. vol. 47, No. 7, pp. 460–463.

Alain Aspect et al., Experimental Realization of Einstein–Podolsky–Rosen–Bohm Gedankenexperiment: A New Violation of Bell's Inequities, Jul. 12, 1982, Phys. Lett., vol. 49., No. 2, pp. 91–94.

Alain Aspect et al., Experimental Test of Bell's Inequalities Using Time–Varying Analyzers, Dec. 20, 1982, Phys. Lett., vol. 49, No. 25, pp. 1804–1807.

Graham P. Collins, Quantum Teleportation Channels Opened in Rome and Innsbruck, Feb. 18, 1998, Physics Today, pp. 18–32.

Herbert Kroemer, Quantum Mechanics for Engineering, Materials Science, and Applied Physics, 1994, Prentice Hall, pp. 12, 13, 20, 525. (no month).

Phillipe H. Eberhard, et al., Quantum Field Theory Cannot Provide Faster–Than–Light Communication, 1989, vol. 2, No. 2, Foundations of Physics Letters, pp. 127–149. (no month).

Z.Y. Ou, et al., Violation of Bell's Inequality and Classical Probability in a Two–Photon Correlation–Experiment Jul. 04, 1988, Phys. Lett., vol. 61, No. 1, pp. 50–53.

(List continued on next page.)

*Primary Examiner*—John R. Lee

*Attorney, Agent, or Firm*—Deveau & Marquis

[57] ABSTRACT

A method and apparatus are disclosed for controlling the quantum state probability distribution of one quantum object of a pair of correlated quantum objects, which include providing a pair of correlated quantum objects, each of said objects having a uniform quantum state probability distribution, providing a system for controlling the quantum state probability distribution of the one quantum object by using said controlling system to choose the probability distribution of the observable quantum states of the other quantum object of the pair of correlated quantum objects, using said controlling system to choose the probability distribution of the quantum states of the other quantum particle, choosing whether to observe the quantum state of the other quantum object, and subsequently observing the quantum state of the one quantum object of said pair of correlated quantum objects to determine if said prepared quantum state probability distribution of said one quantum object has been altered by an observation of the quantum state of the other quantum object. By such method and apparatus, information may be selectively transmitted on observation of the quantum state of the one quantum object by selectively controlling the quantum state probability distribution of the other quantum object of the pair of correlated quantum objects.

36 Claims, 6 Drawing Sheets

OTHER PUBLICATIONS

Z.Y. Ou, et al., Observation of Spatial Quantum Beating With Separated Photodectors, Jul. 4, 1988, Phys. Lett., 61, No. 1, pp. 54–57.

Jim Baggott, The Meaning of Quantum Theory, 1992, Oxford Science Publications, pp. 148–151. (no month).

Thomas J. Herzog, et al., Complementarity and the Quantum Eraser, Oct. 23, 1995, Phys, Lett. vol. 75, No. 17, pp. 3034–3037.

Roger Penrose, Shadows of the Mind (A Search for the Missing Science of Consciousness), Oxford University Press, 1994, p. 293. (no month).

J. Glanz, Measurements are the Only Reality, Say Quantum Tests, Science, Dec. 1, 1995, vol. 270 pp. 1439–1440.

$$P_{OTHER} = (0.125, 0.125)$$
$$P_{ONE} = (0.125, 0.125)$$

METHOD AND APPARATUS FOR SELECTIVELY CONTROLLING THE QUANTUM STATE PROBABILITY DISTRIBUTION OF CORRELATED QUANTUM OBJECTS

BACKGROUND OF THE INVENTION

This invention relates to quantum non-locality modulated signalling methods.

It has been demonstrated, by Aspect and others, that under some circumstances, certain atomic species and non-linear downconversion crystals can be induced to emit pairs of photons that have correlated polarizations, depending on the nature of the source, the correlated linear polarizations of the photon pairs are either always at 90 degrees to each other or always parallel to each other. The photons can be provided in separate streams, with either one of each pair in each stream or with each photon having an equal probability of being found in either stream. It has further been strongly demonstrated that, under certain conditions, these photons are not emitted with any predetermined directions of linear polarization, but that the polarization states of the photons is only fixed upon measurement of the polarization of one of the photons. Thus, assuming perpendicular polarization correlation, if the one photon is measured to be vertically polarized, then the other photon becomes horizontally polarized at that moment, no matter how far apart the two photons have traveled prior to the measurement. The polarization states of the two photons are 100 percent entangled; measurement of the polarization state of one photon determines the polarization state of the other, but prior to measurement, their polarization states are indeterminate. In essence, the two photons are parts of the same object; no matter how far they travel apart from each other, changing the properties of one photon instantly changes the properties of the whole object, including the properties of the other photon. The experiments of Aspect, et al., have convinced most quantum theorists that the polarizations of these correlated photons are non-local; the polarizations are not predetermined at the time of emission, but are rather condensed into a particular state at the moment of "observation" of one of them. A. Aspect, P. Grangier and G. Roger, Phys. Lett. 47, 460 (1981) and 49, 91 (1982). A. Aspect, J. Dalibard and G. Roger, Phys. Lett. 49, 1804 (1982); Z. Y. Ou and L. Mandel, Phys. Lett. 61, 50 (1988) and 61, 54 (1988).

Various quantum theorists and experimentalists have addressed the question of whether the non-locality effects of correlated particles can be employed as the basis for sending information. The published conclusions of Aspect and others have asserted that such is not possible. Baggott, Jim, *The Meaning of Quantum Theory,* Oxford Science Publications, Oxford University Press, 1992, pp. 148–150; P. Eberhardt and R. Ross, Found. Phys. Lett., 2, 127 (1989). The logic is that the passage rate of either stream of correlated photons through its respective polarizer will always appear random. What is not random is the correlation of polarization between the two photons. Since the receiver cannot know the state of the sender's photon, then the receiver cannot glean information from the photons he receives. The signal and the noise are, therefore, of equal magnitude.

These conclusions are correct, so far as they go. In the systems which have been previously analyzed, the correlated photon light source is placed midway between the sender and the receiver and a single polarizer is considered at each end of the dual photon stream, one for the sender and one for the receiver, and the coincidence of photon detection at the sender and receiver, as a function of polarizer angle, is observed. It does appear to be true that information cannot be sent by correlation of photon polarizations by means of such an apparatus designed especially for coincidence counting.

It appears that prior researchers in this field have assumed that since information cannot be transmitted by polarization correlation using two polarizers and two or more detectors, then the addition of more polarizers to the system will not improve matters. It is apparently also generally assumed that once a photon passes through a linear polarizer its polarization state is fixed.

I have discovered that additional polarizers, when properly arranged and controlled, allow the separation of signal information from noise in a correlated photon system and enable the use of such a system for the transmission of information. This end is achieved without the need to perform correlation measurements. Unlike previous correlated quantum particle communication methods the subject invention does not require that both photons of a correlated pair be sent to the receiver so that coincidence counts may be performed. In fact, if polarization correlation measurements or coincidence count measurements are performed, the correlation may appear to be random. Furthermore, it is therefore not the state of the photon, or quantum object, correlation which is communicated, but rather the state of the apparatus which is communicated. The apparatus is considered to include the system at the sending end, the system at the receiving end, and the correlated stream of photons which connect the two. A change in the apparatus at the sending end immediately affects the observations at the receiving end since the two ends are connected by single quantum objects with ends in both locations.

SUMMARY OF THE INVENTION

It is, therefore, an object of the invention to provide a means for sending information by control of non-local correlation effects in correlated pairs of quantum objects.

It is a further object of the invention to provide a means for linking two physically separated measurement apparatus by means of quantum non-locality effects.

It is yet another object of the invention to provide a means to establish a co-temporal reference point for two physically separated measurement apparatus.

It is an additional object of the invention to provide a means for sending information by the transmission of one quantum object of a pair of quantum objects to a receiver, the transmission of the other quantum object of a pair of quantum objects to a sender, and to control of the probability distributions of the receiver directed quantum object by means of control of the probability distributions of the sender directed quantum object.

The subject invention is based on two quantum physics effects: the non-local correlation of quantum states of paired quantum objects and the interaction of individual quanta with a certain sequential arrangements of spin selection devices.

Quantum mechanics is a very successful set of rules and mathematical operators which can be used to predict the statistical behavior of a large number of quantum objects such as bosons, fermions and atoms and including, in particular, photons, the quantum units of light. Quantum mechanics does not explain why these rules work, nor why they exist in the first place. The meaning of the rules and their underlying philosophy is open to wide interpretation. The most widely accepted interpretation of quantum mechanics is called the Copenhagen Interpretation. One of the main tenets of the Copenhagen Interpretation is that the specific properties of a quantum object are not fixed until the moment of observation or detection of that object. Science, Vol. 270, 1 Dec. 95, pp. 1439–1440. The experiments of Aspect and other researchers strongly support that this is true, especially for photons. Aspect 3 papers, Ou & Mandell, Baggott, supra.

Because of this principle, when quantum particles interact with each other, their quantum states are entangled and the subsequently measured properties of the particles are linked, or correlated. Since the original interaction involves the conservation of energy, momentum, quantum number, or other property, the states of the two particles must satisfy the appropriate conservation laws when they finally are measured. Furthermore, if the properties of each particle are not fixed until the moment of measurement, the only way that the conservation laws can be satisfied is if the act of measurement of the properties of one of the particles causes its correlated particle to instantly take on the properties consistent with conservation. The Copenhagen Interpretation proposes that the act of measurement of one quantum object "collapses" the superimposed potential quantum states (the Schrodinger wave function) of the other correlated quantum object to the required quantum state.

In the case of correlated photons, their linear polarizations are 100 percent entangled, either polarized parallel to each other or polarized orthogonal to each other (Type I and Type II, respectively) according to the manner of their creation, in order for the law of the conservation of angular momentum to be satisfied. It is as though the photons represent the two ends of a constantly lengthening, perfectly rigid rod. When one end is twisted to a particular position when that photon interacts with a linear polarizer, so must the other end immediately twist its photon.

The second effect employed in this invention involves the specific nature of the interaction of quantum objects with spin selection devices. For example, the interaction of light with polarizers is usually explained in terms of electromagnetic wave theory, in which a polarizer selectively absorbs (or reflects) the vector component of the electric field which is perpendicular to its polarization axis. This view is satisfactory when dealing with huge numbers of photons, but individual photons show a very different view.

The energy of a photon is directly linked to the color of the photon. When randomly polarized light impinges upon a linear polarizer, approximately 50 percent of the light is passed, and 50 percent is absorbed or reflected, depending on the type of polarizer. (For simplicity, the following explanation will be limited to absorption polarizers). If each photon gave up half its energy by losing its electric field component that was perpendicular to the polarization axis, then the color of that photon would change dramatically. No color change is noted, however, when this experiment is performed, so individual photons do not interact with polarizers in that manner. One polarization direction causes the photon to be absorbed by the polarizer, the other direction causes it to pass through it. Half the photons choose one orientation, half the other, so the net result looks the same as the electromagnetic theory.

It is commonly known that if a second polarizer, or spin selection device, is placed in the path of the light after it passes through the first polarizer, the percent of light passing this second polarizer depends on the angle of its polarization axis with respect to the first polarizer. If the polarization axes are parallel, virtually all of the light passing the first polarizer will also pass the second. If the polarization axes are orthogonal to each other, i.e., crossed, or at 90 degrees to each other, almost all of the light passing the first polarizer will be blocked, or absorbed, by the second polarizer. The small amount of light which does get through is called leakage, and it is a measure of the efficiency of the polarizers. High efficiency polarizers have a very low leakage level when crossed, on the order of 1/10th of one percent (Glan-Thompson polarizing prism Newport part number 10GT04AR.14). It is probably impossible to provide perfectly efficient polarizers because of photon tunneling effects.

Referring to a pair of crossed polarizers, their important feature is their orthogonal polarization axes. For simplicity, let us assume that the first polarizer has a horizontal polarization axis and the second a vertical polarization axis, and that the polarizers are perfectly efficient. We will assume that prior to encountering the first polarizer, the polarization state of the photon is indeterminate. (Correlated photons emitted by certain non-linear parametric down-conversion crystals possess a "latent" polarization state, but the polarization correlation between the two photons can still be obtained by performing certain operations on the photons.) Upon encountering the first polarizer, the photon must choose either a vertical polarization or a horizontal polarization. The photon has an equal probability of choosing horizontal or vertical. If a vertical polarization is chosen, the photon will be absorbed; its polarization has now been observed. If it chooses a horizontal polarization, it will be passed by the polarizer. It is important to note that a photon which passes through a polarizer has not yet been observed, its energy has not yet been delivered to an electron, so its polarization state is still subject to change. I refer to a photon in this state as having a "latent" polarization. This does not mean that it can take any arbitrary polarization without external influence, rather it means that external influences can alter the final observed polarization.

It is known that undisturbed photons which pass through a horizontal polarizer will not subsequently pass through a vertical polarizer. When the potentially horizontally polarized photon encounters the second, vertical, polarizer, it is absorbed. The probability of choosing a vertical polarization is virtually zero for a photon first passing through a horizontal polarizer.

Now the third polarizer enters the experiment. The first polarizer encountered by a photon is usually called the polarizer, and the second is called the analyzer. The third polarizer is placed in between the polarizer and the analyzer, and it will be called the gate. Let us assume that in this three polarizer experiment the gate is oriented with its polarization axis parallel to the polarizer. It is clear that this orientation of the gate will have no effect on the passage of photons through the analyzer; the photons which pass through the polarizer will also pass the gate and be stopped by the analyzer. If the gate is oriented parallel to the analyzer, it will also have no effect on the passage of photons through the analyzer. The gate then acts like the analyzer and the photons which pass the polarizer are stopped by the gate, never even getting to the analyzer.

A peculiar thing happens when the gate is oriented at an angle which is not parallel to either of the other polarizers. It is convenient to choose the angle of the gate to be +/−45 degrees from both the analyzer and the polarizer. A photon passing through the polarizer has a "latent" horizontal polarization (latent because it has not been observed to have this polarization). This "horizontally polarized" photon has a 50/50 chance of passing through the gate or being absorbed by it. When it encounters the gate, it must choose a new polarization, either parallel to the polarization axis of the gate or perpendicular to it, and be passed or absorbed, respectively.

If the photon passes the gate, it now has a "latent polarization" of 45 degrees, and instead of having a zero probability of passing the analyzer, it has a 50 percent chance. Upon encountering the analyzer, the photon chooses either to be absorbed as a horizontally polarized photon, or to be passed as a vertically polarized photon. Thus, the original "horizontally polarized" photon is caused to become a vertically polarized photon by imposing an intermediate quantum decision upon it.

The proportion of photons which pass each of the polarizing elements is 50 percent, so the probability or proportion of photons which make it all the way through all three polarizing elements is (0.5×0.5×0.5)=0.125, or 12.5 percent. These are the photons that make all of the "right" decisions at each polarizer. The remainder, 87.5 percent, make one "wrong" decision somewhere along the way and get absorbed.

In summary, it is known that certain processes can produce correlated pairs of quantum objects, such as photons, which have entangled linear polarization; measurement of the polarization of one photon sets the polarization state of its companion to a compatible value. It is also known that the linear polarization of a photon can be altered, without detection, by causing the photon to make a sequence of quantum choices as it passes through a series of polarizers.

In light of these teachings, the above objects of the present invention are accomplished by providing a method and apparatus for controlling the quantum state probability distribution of one quantum object of a pair of correlated quantum objects, which method includes the steps of providing a pair of correlated quantum objects, each of said objects having a uniform quantum state probability distribution, providing a means for controlling the quantum state probability distribution of the one quantum object by using said controlling means to choose the probability distribution of the observable quantum states of the other quantum object of the pair of correlated quantum objects, using said controlling means to choose the probability distribution of the quantum states of the other quantum particle, choosing whether to observe the quantum state of the other quantum object, and subsequently observing the quantum state of the one quantum object of said pair of correlated quantum objects to determine if said prepared quantum state probability distribution of said one quantum object has been altered by an observation of the quantum state of the other quantum object. By such method, information may be selectively transmitted on observation of the quantum state of the one quantum object by selectively controlling the quantum state probability distribution of the other quantum object of the pair of correlated quantum objects and thereby selectively choosing whether to affect an alteration of the quantum state of the one quantum object which is subsequently observed.

The method of the invention is suitable for a variety of quantum objects including bosons, fermions, and atoms, including, in particular, photons. The pair of correlated quantum objects may be provided as a part of a pair of streams of correlated quantum objects which may be provided by any one of a number of means including, but not limited to, a two-quantum object absorption/two-quantum emission process, such as spin conserving two photon emission processes including, for example, atomic cascade and spontaneous emission from atomic deuterium or atomic calcium, and optical parametric down-conversion processes, including both Type I and Type II spin correlation processes.

Preferably, the source of the pair of correlated quantum objects provides a pair having a randomized quantum state probability distribution. Where the pair of correlated quantum objects is provided without a randomized quantum state probability distribution, the quantum state probability distribution can be randomized by various means, such as by rotating the plane of polarization, or spin direction, of one stream of quantum objects and combining it with the other, unrotated stream of quantum objects. Ou and Mandel 1, supra.

The means for controlling the quantum state probability distribution of the one quantum object by using the means to choose the probability distribution of the observable quantum states of the other quantum objects consist of quantum spin selection or quantum spin altering devices such as polarizing beam splitters, Nichols prisms, wave plates, Pockels cells, dichroic polarizing plastic sheet material and Stern-Gerlach spin analyzers. Preferably, the pair of correlated quantum objects is provided as a part of separated streams of correlated quantum objects. In the case of correlated photons, this may be accomplished by use of a device selected from the group consisting of lenses, prisms, mirrors, polarizing beam splitters and combinations thereof in conjunction with the source for providing such correlated photons in order to provide an equal probability of first detecting either photon of a pair in either stream. In the case of other correlated quantum objects other than photons, this may be accomplished by use of devices which are the functional equivalent of the optical devices, such as the use of a uniform magnetic field to act as a 'prism' for charged correlated quantum objects.

The step of choosing whether to alter and observe the probability distribution of the quantum states of the other quantum object may selectively include either observing or not observing the quantum state of the other quantum object, depending upon whether the user of the method desires to transmit information by modulating the quantum state probability distribution of the one quantum object, or not. In addition, by observing the quantum state of the other quantum object by means of a spin selection device, it is possible to select whether to alter or not to alter the probability distribution of the one quantum object depending upon the choice of spin selection device.

My invention may be more completely understood by reference to the drawings and detailed description of the preferred embodiment provided below.

DESCRIPTION OF THE PREFERRED EMBODIMENT

Figure 1:
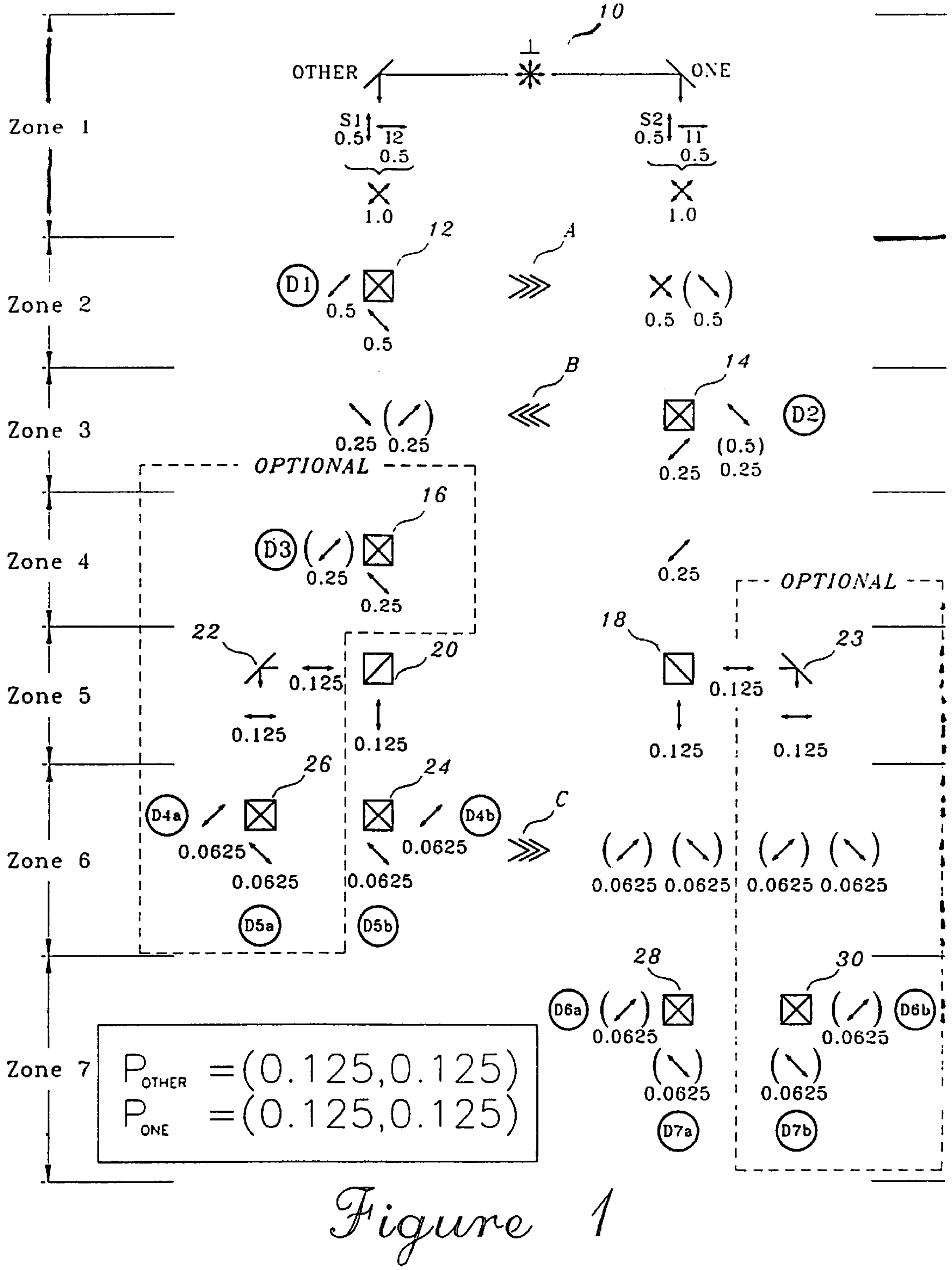
FIG. 1 is a schematic illustration of one embodiment of my present invention.

Referring now to the Figures wherein the reference numerals designate like parts, the system and method of the present invention is shown in its preferred embodiment.

Figure 2:
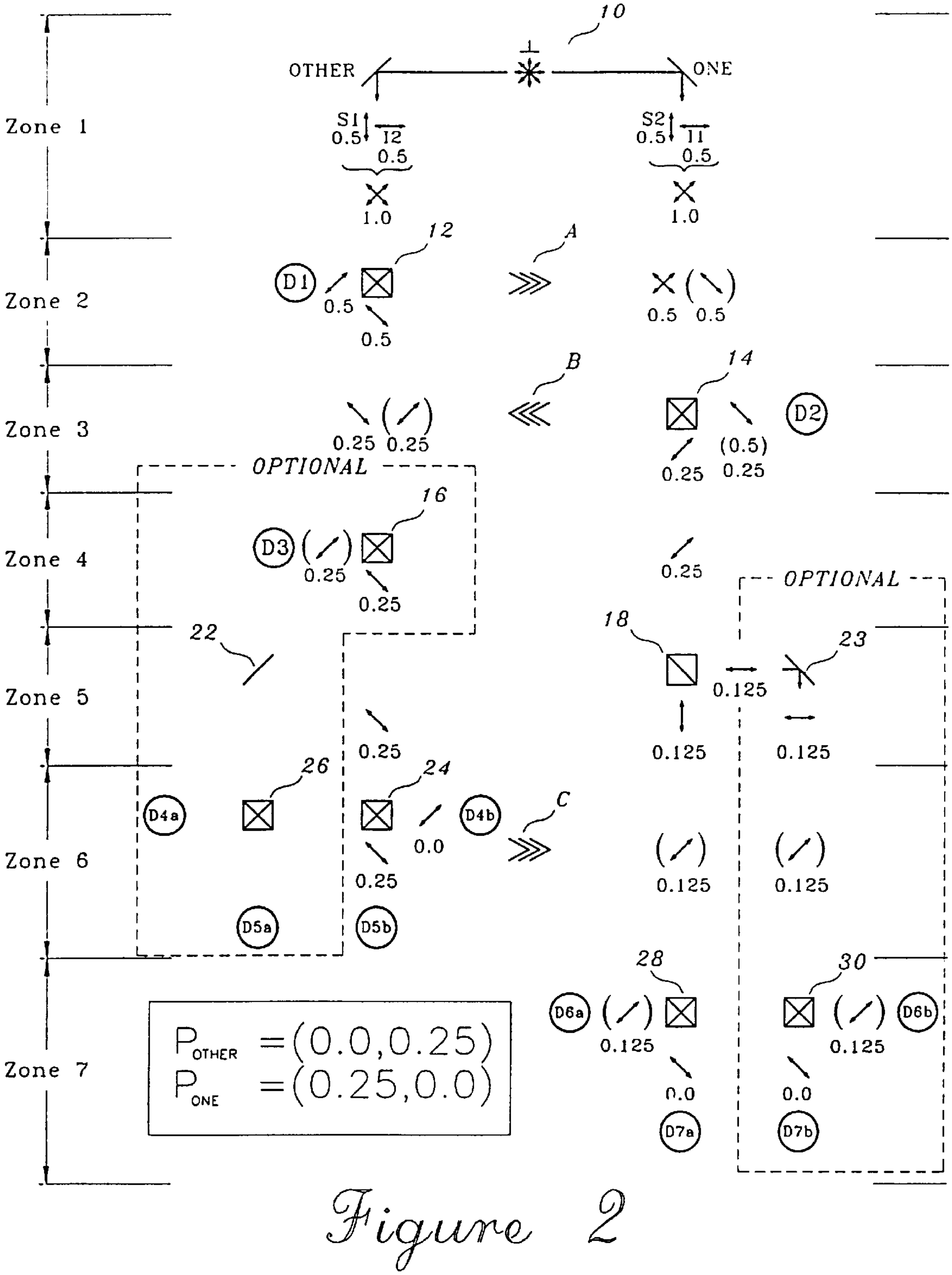
FIG. 2 is a schematic illustration of the invention of FIG. 1 modified to show how the signalling can be switched.

All of the Figures are divided into zones to facilitate their explanation. FIGS. 1 and 2 illustrate the operation of this invention by tracing the polarization states of photons emitted from a source, 10, of Type II correlated photon pairs through two different optical paths. The paths are labeled ‘other’ and ‘one’. They are drawn as though they are parallel to each other in order to make clear the temporal relationship of the processes acting on the photons. In practice these paths are more likely to extend in opposite directions from the source, 10. Each of the zones represents a cotemporal period for the photons in both paths; the beginning and ending positions of the zones represent equivalent optical path distances for their respective photons from the source, 10. Thus ‘other’ photons will arrive at the beginning of zone 2 in the ‘other’ path at the same time as ‘one’ photons will arrive at the beginning of zone 2 in the ‘one’ path, and both photons of the correlated pair will have travelled the same optical path distance from the source, 10. The zones are encountered sequentially by the photons, so the operations of zone 1 are performed before those of zone 2, and so on. A key to the symbols used in the Figures is given below in Table I.

TABLE I

| Key to the Figures | |
|---|---|
| 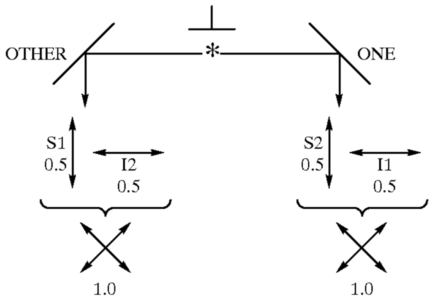  | Type II correlated photon source providing signal and idler photons having an equal probability of being detected in either the ‘one’ path or the ‘other’ path, having perpendicular polarization presets, and being constrained to be found in opposite paths upon detection. The photons are degenerate in frequency and in the linear polarization state complimentary to their preset polarization state. |
| 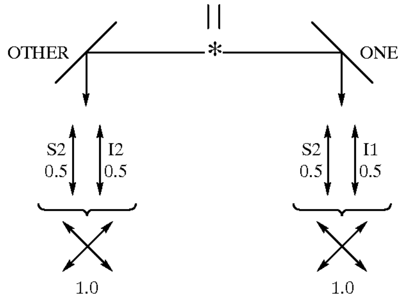  | Type I correlated photon source providing signal and idler photons having an equal probability of being detected in either the ‘one’ path or the ‘other’ path, having parallel polarization presets, and being constrained to be found in opposite paths upon detection. The photons are degenerate in frequency and in the linear polarization state complimentary to their preset polarization state. |
|  | +/− 45 degree polarizer |
|  | Horizontal-vertical polarizer |
|   | High efficiency photon detector |
| 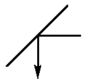 | Mirror |
| 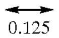 0.125 | Horizontally polarized correlated pair photon state and its associated probability |
|  0.125 | Vertically polarized correlated pair photon state and its associated probability |
|  0.25 | +45 degree polarized correlated pair photon state and its associated probability |

TABLE I-continued

| Key to the Figures | |
|---|---|
|  0.0625 | −45 degree polarized correlated pair photon state and its associated probability |
|  0.0625 | Parentheses around a photon state or its probability indicate that the state is a single photon state; one photon of the correlated pair has been observed and the remaining photon has attained the indicated polarization state |
| >>> | Non-local quantum correlation event: observation of the polarization state of the 'other' photon sets the observable states of its 'one' correlated pair photon |
| <<< | Non-local quantum correlation event: observation of the polarization state of the 'one' photon sets the observable states of its 'other' correlated pair photon |

Referring now to FIG. 1, a source, 10, of frequency degenerate Type II correlated photon pairs provides photons into the two paths, 'other' and 'one'. These photons are preferably produced by a Type II optical degenerate parametric downconversion process, arranged such that the photons consist of an equal number of correlated pair signal and idler photons which all have an equal probability of being found in either path, with one preferred caveat; if a particular photon is observed in one path then its pair photon can only be subsequently observed in the other path. This caveat can be relaxed at the expense of the signal to noise ratio. A source of this type will provide the signal and idler photons in orthogonal polarization states which are related to the polarization state of the pump beam of the source. For convenience, the signal photons are assumed to be vertically polarized and the idler photons are assumed to be horizontally polarized. Half of the light entering the 'other' path consists of vertically polarized signal photons and half consists of horizontally polarized idler photons, as shown at the top of zone 1 of the 'other' path. These signal and idler photons are not paired with each other, but are paired with idler and signal photons, respectively, entering the 'one' path. Thus the signal photons in the 'other' path are labeled S1 and the idlers 12, while the signal photons in the 'one' path are labeled S2 and the idlers I1. S1 signal photons are paired with I1 idler photons and S2 signal photons are paired with 12 idler photons, but only upon observation of one of the photons of a pair. Until that time all signal photons and all idler photons have an equal probability of being detected in either path.

The horizontal-vertical (H–V) polarization state of a photon and the +/−45 degree polarization state of the same photon are complimentary quantum states subject to the Heisenberg Uncertainty principle. If complete information exists about one of these states, then no information exists about its complimentary state. Since the H–V state of the photons emitted from the source, 10, is completely known, the +/−45 degree state of these photons is completely indeterminate, as shown at the bottom of zone 1. Since the signal and idler photons are degenerate in frequency, indistinguishable in +/−45 degree polarization state, and indistinguishable in propagation direction and in the probability of being detected in either path, the signal and idler photons are completely indistinguishable from each other. I refer to this as maintaining the anonymity of the photons, and it is a requirement for maintaining observable non-local quantum correlation effects. The correlated photons leaving zone 1 enter zone 2 in this uniform, anonymous state.

This invention enables signaling by discarding photons which make 'bad' polarization state choices and retaining photons which make 'good' polarization state choices. The first of these 'purifying' steps is made in zone 2 by the +/−45 degree polarizing beam splitter, 12, in the 'other' path. The 'other' photons which enter polarizer 12 have an equal probability of leaving to the left with a +45 degree polarization and being detected by detector D1, or passing straight through with a 'latent' polarization of −45 degrees. This is a 'latent' polarization because the photon has not yet been observed to be in this state, and its final observed polarization state may be altered by subsequent passage through additional polarizing optics.

The photons which are detected by D1 have been observed in a +45 degree polarization state. According to the Copenhagen Interpretation of quantum mechanics the observation of these photons collapses the wavefunction of the correlated pair of photons, effectively instantly materializing the remaining photon in the 'one' path with a polarization orthogonal to that of the detected photon. The collapse of the wavefunction by detection of the photon in the 'other' path constitutes a correlation event, symbolized by >>>, labeled A in FIG. 1. Each 'one' photon which has its correlated pair 'other' photon detected by D1 attains a polarization of −45 degrees. These 'one' photons are now single photons, no longer part of a correlated pair of photons, and this state is symbolized by parentheses around the polarization direction symbol and probability value.

Those 'one' photons which are still part of a correlated pair remain in an indeterminite +/−45 degree state. The remaining 'other' photons pass through beam splitter 12 and leave zone 2 with a latent −45 degree polarization.

In zone 3 the 'one' photons enter polarizing beam splitter 14, which deflects all of the single photons and half of the remaining paired photons into detector D2. The detection of the single photons by D2 does not have any effect on the photons in the 'other' path, since the 'other' photons which were paired with the single 'one' photons were previously detected by detector D1 in zone 2. The paired 'one' photons which are detected by D2 are observed to be in the −45 degree state, so their pairs in the 'other' path correlate to a +45 degree state, becoming single photons. This is indicated by the correlation symbol labeled B. The 'one' photons which pass through polarizer 14 attain a latent +45 degree polarization state.

The 'other' photons now consist of an equal mixture of single photons in the +45 degree polarization state and paired photons with a latent −45 degree polarization. Upon entering zone 4 these 'other' photons encounter +/−45 degree polarizing beam splitter 16, where the now single photons are deflected to detector D3 and the paired photons pass through, retaining their latent −45 degree polarization state. These remaining 'other' photons are the pairs to the remaining 'one' photons. It can be seen from FIG. 1 that at this point 75 percent of the input photons to each of the 'one' path and the 'other' path have been discarded because one or the other of the photons of a pair made a 'bad' choice of polarization state. The remaining 25 percent of the input photons made 'good' polarization state choices, making them useful for signalling. These are the photons which pass from zone 4 to zone 5.

The paired 'one' photons arriving in zone 5 enter horizontal-vertical (H–V) polarizer 18 and are separated with equal probabilities into rightward deflected horizontal (H) photons and downward passing vertical (V) photons. In order to keep FIG. 1 compact the H photons are shown reflecting from mirror 23, which does not alter their polarization state. The 'other' photons arriving in zone 5 enter H–V polarizer 20 and are equally divided into leftward deflected H photons and downward passing V photons in a similar manner, the H photons being reflected from mirror 22 for the same reason as the 'one' photons were reflected from mirror 23. Both the 'one' and the 'other' photons leave zone 5 in determinate H–V states and indeterminite +/−45 degree states.

The H–V 'other' photons arriving in zone 6 enter polarizing beam splitters 26 and 24, respectively, and are detected in definite +/−45 degree polarization states by detectors D4a, D4b, D5a and D5b. Detectors D4a and D4b observe the 'other' photons which attain a +45 degree polarization state and the detectors D5a and D5b observe the 'other' photons which attain a −45 degree polarization state. The observation of the 'other' photons constitute correlation events which set the +/−45 degree polarization states of their pairs in the 'one' path. This is indicated by the correlation symbol labeled C. Half of the 'one' photons attain a +45 degree latent polarization and half attain a −45 degree latent polarization. As indicated by the parentheses around the polarization vectors, these 'one' photons are now single, having lost their 'other' pair photons.

The single 'one' photons leaving zone 6 enter polarizers 28 and 30 in zone 7 and are observed in definite +/−45 degree polarization states by detectors D6a, D6b, D7a and D7b. Detectors D6a and D6b observe the 'one' photons having a +45 degree polarization state and detectors D7a and D7b observe the 'one' photons having a −45 degree polarization state.

Of significance is the probability distribution of the photons detected in zones 6 & 7, represented as a proportion of the total photons provided by source 10 into each 10 of the 'one' and the 'other' paths which are observed to be in the +45 degree state, and the proportion in the −45 degree state. The probability distribution of the 'other' photons is (0.125, 0.125). The probability distribution of the 'one' photons also (0.125, 0.125). This will be the observed result with the H–V polarizer 20 in place. These 'one' probability distributions may be considered to be the first state of a binary state signalling method. The second state is illustrated in FIG. 2.

The optical arrangement of FIG. 2 is identical to that of FIG. 1, with one exception; H–V polarizer 20 has been removed from the 'other' path. The optical processes and polarization states of zones 1, 2, 3 and 4 of FIG. 2 are the same as shown in the same zones of FIG. 1.

'Other' photons entering zone 5 pass through it unaltered, remaining in their latent −45 degree state established in zone 2. No 'other' photons are deflected to mirror 22 and therefore no 'other' photons enter +/−45 degree polarizer 26 and none are observed by detectors D4a and D5a in zone 6. The 'other' photons arriving in zone 6 enter +/−45 polarizer 24 and pass straight through to detector D5b. No 'other' photons entering zone 6 have a +45 degree latent polarization state, so none are deflected by polarizer 24 to detector D4b. The observed probability distribution of the 'other' photons, as previously defined, is changed to (0.0, 0.25) when H–V polarizer 20 has been removed.

'One' photons entering zone 5 are processed in the same manner as in FIG. 1; they enter H–V polarizer 18 and are equally divided into H and V states, thereby losing their latent +45 degree state produced in zone 3. In zone 6 the observation of the 'other' photons in a −45 degree state by detector D5b sets the latent polarization state of the 'one' photons to a +45 degree state by non-local quantum correlation effects represented by correlation symbol C. The 'one' photons arriving in zone 7 enter +/−45 degree polarizers 28 and 30 and are detected by detectors D6a and D6b. Since there are no 'one' photons with a latent −45 degree state, none pass through polarizers 28 and 30 for detection by detectors D7a and D7b. The observed probability distribution of the 'one' photons, as previously defined, is thus changed to (0.25,0.0). These changes to the quantum state probability distributions of the "other" and "one" photons constitutes a signalling event.

It is important to note that no change was made to source 10, nor were any 10 changes made to any of the optical elements in the 'one' path, between the arrangements of FIG. I and FIG. 2. The only change made between these two arrangements is the inclusion or exclusion of H–V polarizer 20 in the 'other' path. The 'other' path and the 'one' path may be physically widely separated, yet this alteration of the optical arrangement in the 'other' path will alter the observed probability distribution of the photons in the 'one' path.

Many features of this invention may be altered without materially altering the ability to affect the observed probability distribution of 'one' photons by manipulating the observed probability distribution of the 'other' photons by the inclusion or exclusion of polarizer 20. As shown in these Figures, the polarizers are of the thin film beam splitter variety. They could, however, be of other varieties, such as Wollaston prism polarizers (Karl Lambrecht part number MW2A-10-5), magnesium fluoride Rochon prisms (Karl Lambrecht part number MFRV-9), traditional 'pile of plates' polarizers, or dichroic plastic polarizing sheet polarizers (International Polarizer part number IP38). The signal modulating polarizer, H–V polarizer 20, could be replaced by an electro-optic device which can be controlled to either deflect the 'other' photons through an H–V polarizer or to pass them unaltered, or by other active polarization altering components, such as a Kerr cell or a Pockels cell.

In both FIGS. 1 and 2 a number of the optical elements are enclosed by dashed boxes labeled 'OPTIONAL'. If these elements are removed the observed 'one' 30 probability distribution will be different from that of FIGS. 1 and 2 because the horizontal photons deflected by polarizer 18 will be discarded and will not proceed on to the 'one' zone 7 detectors. Removal of these elements does not eliminate the dependence of the 'one' probability distribution on the presence or absence of 'other' polarizer 20. Removal of these elements also alters the observed probability distribution of the 'other' photons because both single 'other' photons and paired 'other' photons will be observed by detectors D4b and D5b. With these elements in place as shown in FIGS. 1 and 2 single 'other' photons are 'purified' from the 'other' path, leaving only paired 'other' photons to be detected by detectors D4b and D5b. If the optional elements are removed from FIG. 1 the probabilities for the 'other' and the 'one' paths are (0.125,0.125) and (0.0625, 0.0625) respectively. If the optional elements are removed from FIG. 2 the probabilities for the 'other' and the 'one' paths are (0.25,0.25) and (0.125,0.0) respectively.

The function of H–V polarizers 18 and 20 and the mirrors 22 and 23 may be replaced by suitably arranged quarter wave plates which randomize the polarization probability distribution of the photons passing through them. This simplifies the apparatus by eliminating polarizers 18, 20, 26, and 30, mirrors 22 and 23, and detectors D4a, D5a, D6a and D7a. Furthermore, polarizer 16 and detector D3 can be eliminated from the apparatus without altering the probability distribution of the 'one' photons and the dependency of that distribution on the presence or absence of the zone 5 'other' polarization randomizing element (polarizer 20 or a quarter wave plate in that position). This simplified apparatus is illustrated in FIGS. 3 and 4.

Figure 3:
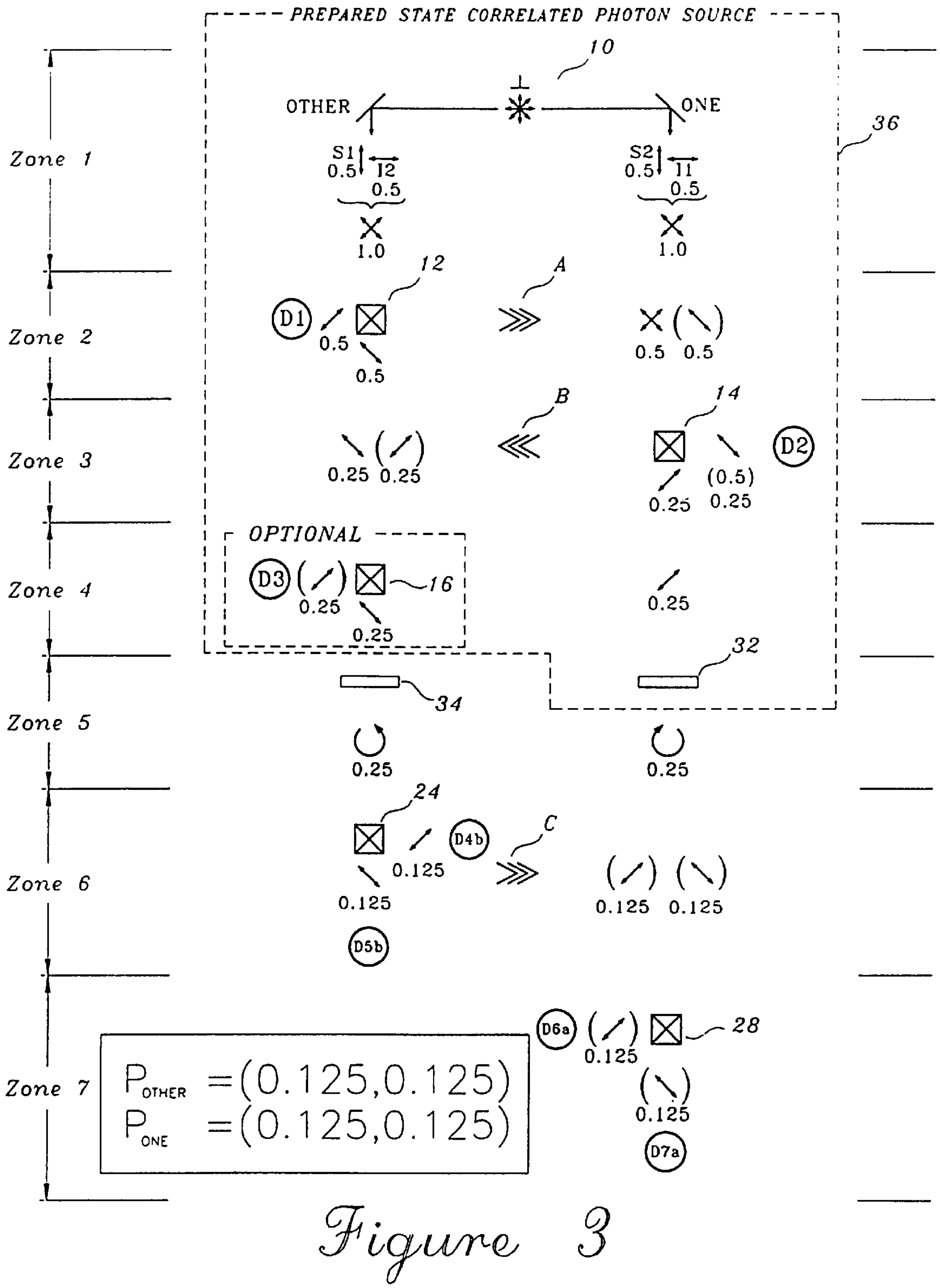
FIG. 3 is a schematic illustration of an alternative embodiment of my present invention.
Figure 4:
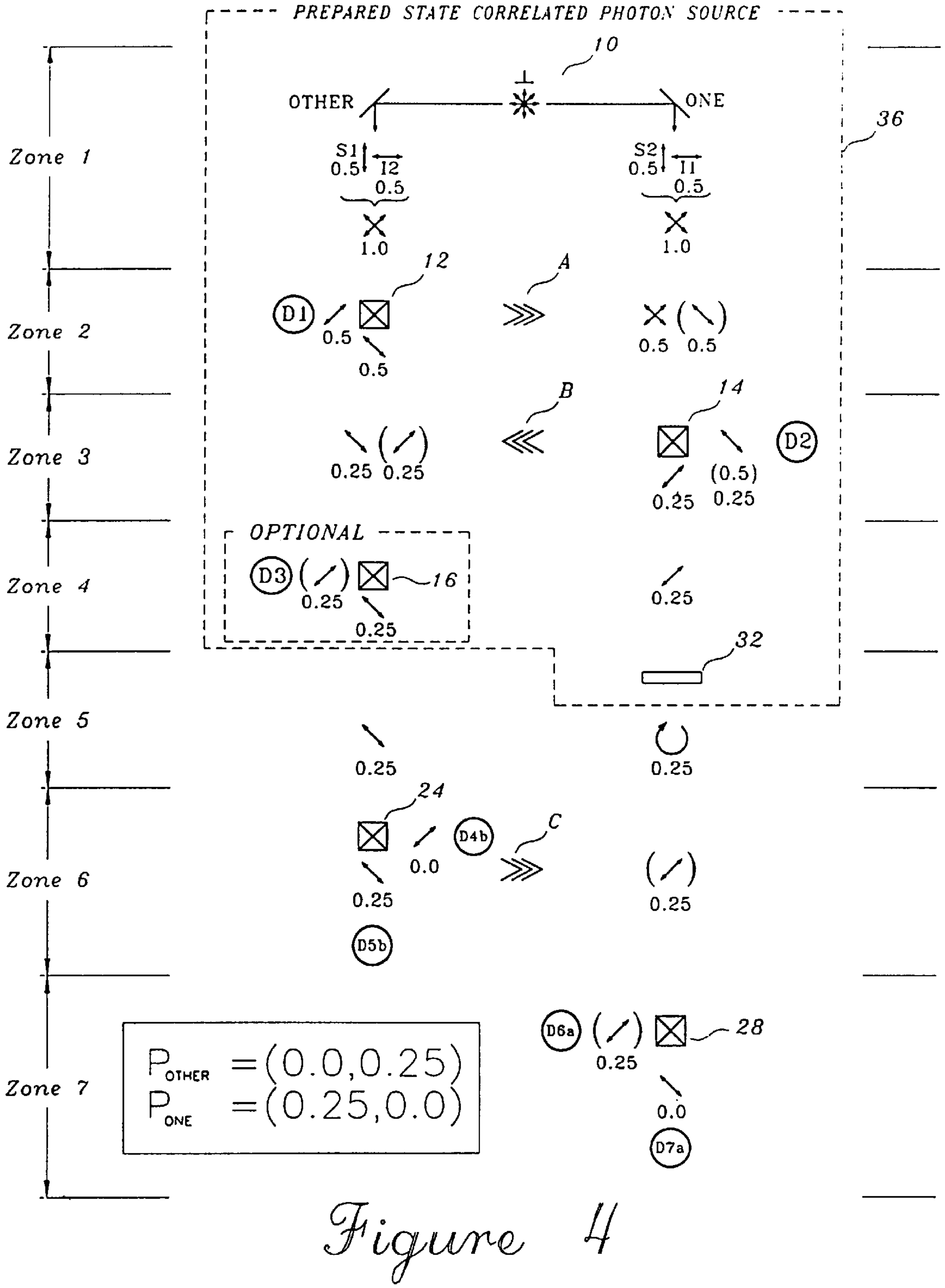
FIG. 4 is a schematic illustration of the invention of FIG. 3 modified to show how signalling can be switched.

FIG. 3 illustrates a simplified embodiment of the invention in which most of the optional elements have been removed and the H–V polarizers 18 and 20 have been replaced by quarter wave plates 32 and 34, respectively. The function of quarter wave plates 32 and 34 is the same as the function of H–V polarizers 18 and 20; both optical devices randomize the observable +/−45 degree polarization state of the photons which pass through them.

The optical processes and polarization states of zones 1, 2, 3 and 4 of FIG. 3 are the same as shown in the same zones of FIGS. 1 and 2. 'One' photons leaving zone 4 enter into zone 5 where they pass through quarter wave plate 32, which is aligned so as to convert their linear polarization state into a circular polarization state. Circularly polarized light has a fifty percent probability of passing through a linear polarizer of any orientation; circularly polarized light has no latent linear polarization state. 'Other' photons leaving zone 4 pass through quarter wave plate 34 in zone 5, also becoming circularly polarized.

In zone 6 the circularly polarized 'other' photons enter +/−45 degree polarizer 24 and are deflected with equal probability to detectors D4b and D5b. The observation of each 'other' pair photon constitutes a correlation event, setting their corresponding 'one' photons to perpendicular polarization states with equal probability of +/−45 degrees. The 'one' photons then pass into zone 7 where they are deflected by +/−45 degree polarizer 28 to detectors D6a and D7a.

The observed probability distribution of the pair 'other' photons at detectors D4b and D5b is (0.125, 0.125). The probability distribution of the 'one' photons at detectors D6a and D7a is also (0.125, 0.125).

The portion of the apparatus from zone 1 through zone 4 and including the 'one' path quarter wave plate in zone 5 is enclosed by a dashed box in both FIGS. 3 and 4. All of the elements within this box can be considered to constitute a prepared state correlated photon source, 36, which provides correlated photons in prepared quantum probability states to the remaining 'one' and 'other' optical elements. The remaining 'one' apparatus, polarizer 28 and detectors D6a and D7a, and the remaining 'other' apparatus, quarter wave plate 34, polarizer 24, and detectors D4b and D5b, can be located at any convenient distance from the prepared state correlated photon source 36, providing that the optical path length from source 10 to 'one' polarizer 28 is greater than the optical path length from source 10 to 'other' detectors D4b and D5b.

FIG. 4 is identical to FIG. 3 except that 'other' quarter waveplate 34 has been removed. The result is to leave the pair 'other' photons in zone 5 with the −45 degree latent polarization they attained in zone 2. When these pair 'other' photons are observed by detectors D4b and D5b in zone 6 they cause their 'one' pairs to correlate to a +45 degree polarization state. The observed probabilities for the 'other' and 'one' photons are thus changed to (0.0, 0.25) and (0.25, 0.0), respectively, which change in probabilities again constitutes a signalling event.

Figure 5:
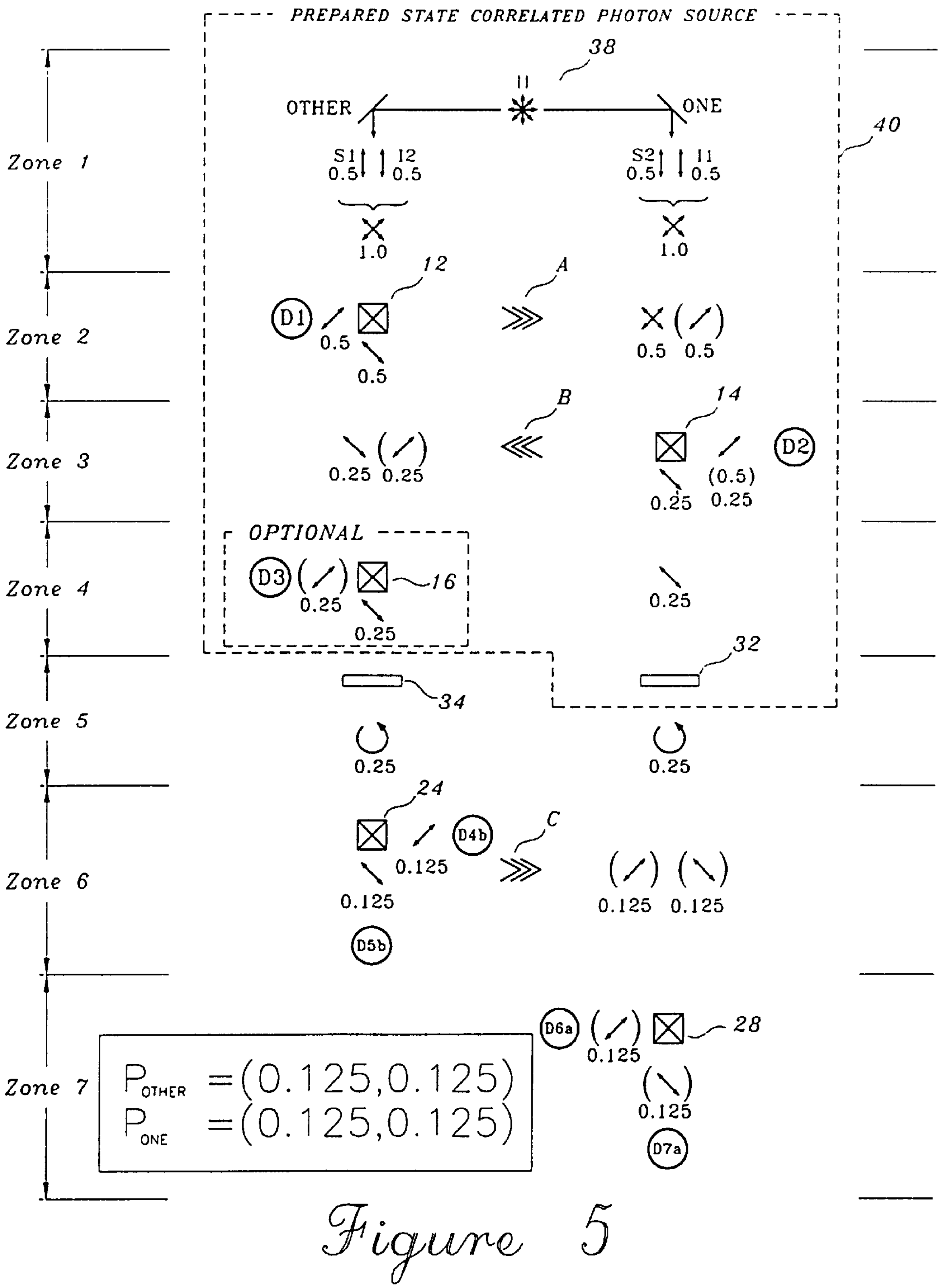
FIG. 5 is a schematic illustration of a further alternative embodiment of my invention employing a different source of photons.
Figure 6:
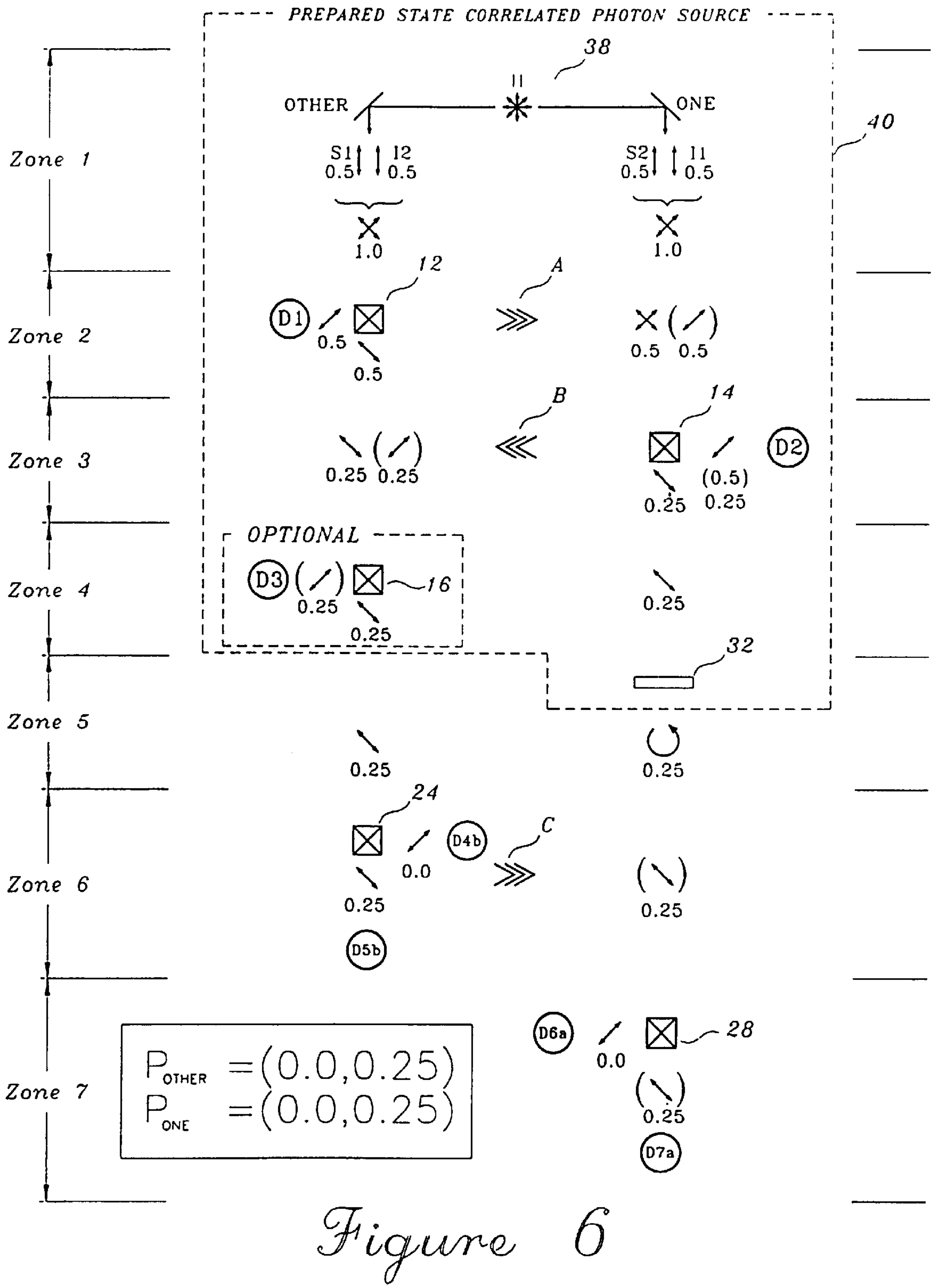
FIG. 6 is a schematic illustration of the invention of FIG. 5 modified to show how signaling can be switched.

FIGS. 5 and 6 illustrate the use of these methods with a Type I, parallel polarization correlation, correlated photon source 38. The arrangement of optical elements is identical in FIG. 5 to that of FIG. 3 with one exception; +/−45 degree 'one' path polarizer 14 has been rotated so as to deflect +45 degree polarized photons to detector D2 and to pass −45 degree polarized photons to the following zones of the apparatus. This is the opposite of the function of polarizer 14 in FIG. 3. While this is the only change in the optical elements, the action of these elements on the correlated photons is different because properties of source 38 requires the photons to correlate to parallel polarization states instead of perpendicular polarization states, as in the previous figures.

The optical elements enclosed by the large dashed-line box in both FIGS. 5 and 6, labeled 40, constitute another form of a prepared state correlated photon source, driven in this case by a Type I correlated photon source 38.

Thus when +45 degree 'other' photons are detected by detector D1 the nonlocal quantum correlation connection sets the latent polarization state of the corresponding 'one' photons to the same +45 degree polarization state. It is these single 'one' photons which are extracted from the 'one' path by polarizer 14. The observed probability distribution of the 'other' and the 'one' photons is the same for FIG. 5 as for FIG. 3, (0.125,0.125) for both 'other' and 'one'.

FIG. 6 illustrates the signaling state for a Type I source which is equivalent to that of FIG. 4 for a Type II source. Polarizer 14 is in the same position as in FIG. 5, and it serves the same function as in that Figure. As in FIG. 4 the 'other' quarter wave plate 34 is removed, allowing the -45 degree state of the 'other' photon to be passed on to detector D5b, setting the polarization state of the corresponding 'one' photons to −45 degrees. The observed probability distribution is now the same for both paths in this figure; (0.0,0.25). Note that the probability distributions of the paths of FIG. 4 were not identical, but opposite each other.

It is important to note that in the methods of all of these Figures, and in any similar or derivative methods, the specific angles of the polarizers and the resulting latent polarization states of the photons are not, in themselves, significant. The significance is in the relationship of each polarizer to the known polarization states of the photons. Thus, if the apparatus were rotated 45 degrees, the H–V output polarization states of the signal and idlers from source 10 would become known +/−45 degree polarization states, the H–V polarizers would become +/−45 degree polarizers, and the +/−45 degree polarizers would become H–V polarizers.

With reference to FIGS. 1–6, I have particularly illustrated the preferred embodiment of my invention employing photons. Alternatively, my invention is suitable for a variety of correlated quantum objects including also bosons, fermions, and atoms. Any source of quantum objects is suitable for my invention provided the source produces correlated quantum objects. Furthermore, the controlling means described above, particularly described as beam splitters, or a quarter wave plate, may be replaced by any suitable spin selection device which may be employed to select a desired quantum state probability distribution of the quantum objects to be observed. Suitable spin selection devices include, not only polarizing beam splitters, but also Nichols prisms, wave plates, Kerr cells, Pockels cells, polarizing plastic sheet material and Stern-Gerlach spin analyzers. Suitable types of detectors for detecting or making an observation of the quantum state of one or both of the pair of quantum objects include micro channel plates, scintillation detectors and Faraday cups.

Having now fully described my invention, it will be apparent to one of ordinary skill in the art that many changes and modifications can be made thereto without departing from the spirit or scope of my invention as set forth herein.

What is claimed:

1. A method for controlling the quantum state probability distribution of a plurality of correlated pairs of quantum objects which pairs have entangled spin states, comprising the steps of:

a. providing a plurality of entangled pairs of quantum objects, each pair including one quantum object and an other quantum object, said pairs existing in a superposition of spin states in at least one chosen spin basis;

b. providing a means for transforming said entangled pairs of quantum objects into a definite spin state in a chosen spin basis;

c. providing means for controlling the spin state probability distribution of the one quantum objects which is capable of choosing the spin state probability distribution of the corresponding other quantum objects of the pairs of entangled quantum objects in a chosen spin basis;

d. choosing whether to change the spin state probability distribution of the other quantum objects of the pairs of entangled quantum objects using said controlling means;

e. choosing whether to observe the spin state probability distribution of the other quantum objects of the pairs of quantum objects in a chosen spin basis using said controlling means;

f. subsequently observing the spin state probability distribution of the one quantum objects of said entangled pairs of quantum objects in a chosen spin basis to determine if said spin state probability distribution of said one quantum objects of said pairs of quantum objects has been altered by an observation of the spin state probability distribution of said other quantum objects of said pairs.

2. A method as in claim 1, wherein said entangled quantum objects are selected from the group consisting of bosons, fermions and atoms.

3. A method as in claim 1, wherein the one quantum objects and the other quantum objects of the pairs of entangled quantum objects are provided as part of a pair of streams of entangled quantum objects.

4. A method as in claim 1, wherein the pairs of entangled quantum objects are provided by a source of entangled pairs of quantum objects.

5. A method as in claim 4, wherein the pairs of entangled quantum objects are provided by a two-quantum object absorption/two-quantum object emission process.

6. A method as in claim 4, wherein the pairs of entangled quantum objects are provided from a source of entangled photons selected from the group consisting of spin conserving two photon emission and optical parametric down-conversion processes.

7. A method as in claim 6, wherein said optical parametric downconversion processes include both Type I and Type II spin correlation processes.

8. A method as in claim 1, wherein said means for controlling includes a spin selection device selected from the group consisting of optical polarization components.

9. A method as in claim 8, wherein said optical polarization components are selected from the group consisting of polarizing beam splitters, Nichols prisms, wave plates, Kerr cells, Pockels cells, polarizing plastic sheet material and combinations thereof.

10. A method as in claim 1, wherein said means for controlling includes non-optical spin selection devices.

11. A method as in claim 10, wherein said non-optical spin selection devices are Stern-Gerlach spin analyzers.

12. A method as in claim 1, wherein the one quantum objects and the other quantum objects of the pair of entangled quantum objects are provided with substantially equal probability in two streams of quantum objects by one or more devices selected from the group consisting of lenses, mirrors, polarizing beam splitters and combinations thereof.

13. A method as in claim 1, wherein said step of choosing whether to observe the spin state probability distribution of the other quantum objects of said pairs of quantum objects includes not observing the spin state probability distribution of the other quantum objects of said pairs of quantum objects.

14. A method as in claim 1, wherein the step of choosing whether to observe the spin state probability distribution of the other quantum objects of said pairs of quantum objects includes observing the spin state probability distribution of the other quantum objects of said pairs of quantum objects.

15. A method as in claim 14, wherein said observing of spin state probability distribution of the other quantum objects of said pairs of quantum objects includes altering the probability distribution of the one quantum objects of said pairs of quantum objects before observing the of spin state probability distribution of the one quantum objects of said pairs.

16. A method as in claim 1, wherein said step of observing the spin state probability distribution of the one quantum objects of said pairs of quantum objects includes observing the spin state probability distribution of the one quantum objects of said pairs to determine if they have a spin state probability distribution complimentary to said observed spin state probability distribution of the other quantum objects of said pairs.

17. A method as in claim 1, wherein said pairs of entangled quantum objects are provided in orthogonal polarization states, upon observation.

18. A method as in claim 1, wherein said pairs of entangled quantum objects are provided in parallel polarization states, upon observation.

19. A system for controlling the quantum state probability distribution of a plurality of pairs of correlated quantum objects each pair including one quantum object and an other quantum object, comprising:

a. a source of entangled pairs of quantum objects, said objects existing in a superposition of states in at least one chosen spin basis.

b. means for transforming said entangled pairs of quantum objects into a definite spin state in a chosen spin basis;

c. means for controlling the quantum state probability distribution of the one quantum objects of said pairs of quantum objects and for choosing the spin state probability distribution of the other quantum objects of said pairs of entangled quantum objects in a spin basis chosen to be complimentary to the definite spin basis;

d. means for subsequently observing the spin state probability distribution of the one quantum objects of said entangled pairs of quantum objects in the said definite spin basis and determining if said spin state probability distribution of said one quantum objects of said pairs has been altered by an observation of the spin state probability distribution of said other quantum objects of said pairs.

20. A system as in claim 19, wherein said entangled quantum objects are selected from the group consisting of bosons, fermions and atoms.

21. A system as in claim 19, wherein the one quantum objects and the other quantum objects of the pairs of entangled quantum objects are provided as part of a pair of streams of entangled quantum objects.

22. A system as in claim 19, wherein the means for providing pairs of entangled quantum objects includes a source of entangled pairs of quantum objects.

23. A system as in claim 22, wherein the pairs of entangled quantum objects are provided by means for providing a two-quantum object absorption/two-quantum object emission.

24. A system as in claim 22, wherein the pairs of entangled quantum objects are provided by means for providing a source of entangled photons selected from the group consisting of devices providing spin conserving two photon emission and optical parametric down-conversion emission.

25. A system as in claim 24, wherein said optical parametric down-conversion emission includes both Type I and Type II spin correlation emission.

26. A system as in claim 19, wherein said means for controlling includes a spin selection device selected from the group consisting of optical polarization components.

27. A system as in claim 26, wherein said optical polarization components are selected from the group consisting of polarizing beam splitters, Nichols prisms, wave plates, Kerr cells, Pockels cells, polarizing plastic sheet material and combinations thereof.

28. A system as in claim 19, wherein said means for controlling includes non-optical spin selection devices.

29. A system as in claim 28, wherein said non-optical spin selection devices are Sten-Gerlach spin analyzers.

30. A system as in claim 19, wherein the one quantum objects and the other quantum objects of the pairs of entangled quantum objects are provided with substantially equal probability in two streams of quantum objects by one or more devices selected from the group consisting of lenses, mirrors, polarizing beam splitters and combinations thereof.

31. A system as in claim 19, wherein said means for controlling is selected to not observe the spin state probability distribution of the other quantum objects.

32. A system as in claim 19, wherein the means for controlling the quantum state probability distribution of the one quantum objects is selected to observe the spin state probability distribution of the other quantum objects.

33. A system as in claim 32, wherein said observing of the spin state probability distribution of the other quantum objects includes altering the probability distribution of the one quantum objects before observing the spin state probability distribution of the one quantum objects.

34. A system as in claim 19, wherein said means of observing the spin state probability distribution of the one quantum objects includes observing the spin state probability distribution of the one quantum objects to determine if they are in a spin state probability distribution complimentary to said observed spin state probability distribution of the other quantum objects.

35. A system as in claim 19, wherein said pairs of entangled quantum objects are provided in orthogonal polarization states, upon observation.

36. A system as in claim 19, wherein said pairs of entangled quantum objects are provided in parallel polarization states, upon observation.

* * * * *